(12) United States Patent
Schweidler et al.

(10) Patent No.: US 7,580,420 B2
(45) Date of Patent: Aug. 25, 2009

(54) INTERFACE CIRCUIT CONNECTING A DEVICE WITH A BRIDGE PORTAL FUNCTION TO A COMMUNICATION BUS

(75) Inventors: Siegfried Schweidler, Gehrden (DE); Dieter Haupt, Springe (DE); Klaus Gaedke, Hannover (DE); Malte Borsum, Hannover (DE); Herbert Schütze, Celle (DE)

(73) Assignee: Thomson Licensing, Boulogne-Billancourt (FR)

( * ) Notice: Subject to any disclaimer, the term of this patent is extended or adjusted under 35 U.S.C. 154(b) by 756 days.

(21) Appl. No.: 10/476,420

(22) PCT Filed: Apr. 18, 2002

(86) PCT No.: PCT/EP02/04286

§ 371 (c)(1),
(2), (4) Date: Oct. 30, 2003

(87) PCT Pub. No.: WO02/089421

PCT Pub. Date: Nov. 7, 2002

(65) Prior Publication Data

US 2004/0131071 A1    Jul. 8, 2004

(30) Foreign Application Priority Data

May 2, 2001    (EP) .................................. 01250155

(51) Int. Cl.
*H04L 12/28* (2006.01)
(52) U.S. Cl. ...................................... 370/402; 370/420
(58) Field of Classification Search ................ 370/401, 370/384, 403, 412, 428, 465, 351, 352, 359, 370/402, 419, 420

See application file for complete search history.

(56) References Cited

U.S. PATENT DOCUMENTS 6,272,120 B1 *    8/2001    Alexander .................. 370/338

(Continued)

FOREIGN PATENT DOCUMENTS

EP    663746    7/1995

(Continued)

OTHER PUBLICATIONS

Title: IEEE Standard-1995; Date: 1995.*

(Continued)

*Primary Examiner*—Ricky Ngo
*Assistant Examiner*—Wei-Po Kao
(74) *Attorney, Agent, or Firm*—Robert D. Shedd; Joseph J. Opalach; Jerome G. Schaefer

(57) ABSTRACT

A wireless extension of the IEEE 1394 bus where two clusters of 1394 devices are linked by a wireless bridge. The device clusters communicate without being bridge-aware. The wireless bridge provides for a bus reset isolation. The wireless extension including a buffer memory for storing self-identification packets in the 1394 interfaces of both boxes of the wireless bridge. With these buffer memories the self-identification packets of the bus stations in the other cluster can be collected and they can be read out during the self-configuration phase of the network after a bus reset when the bus grant is assigned to the box of the wireless bridge that is also connected to the bus where the bus reset has occurred. The physical layer block of the 1394 interface transmits artificial self-identification packets for all bus stations of the other cluster.

13 Claims, 3 Drawing Sheets

U.S. PATENT DOCUMENTS

| | | | |
|---|---|---|---|
| 6,738,843 B2 * | 5/2004 | Bennett | 710/104 |
| 6,813,651 B1 * | 11/2004 | Smith et al. | 710/20 |
| 6,822,946 B1 * | 11/2004 | Wallace | 370/328 |
| 6,834,316 B1 * | 12/2004 | Ishida et al. | 710/62 |
| 6,885,643 B1 * | 4/2005 | Teramoto et al. | 370/252 |
| 6,978,334 B2 * | 12/2005 | Hiratsuka | 710/305 |
| 6,996,112 B2 | 2/2006 | Fukunaga et al. | |
| 2002/0122386 A1 * | 9/2002 | Calvignac et al. | 370/230 |

FOREIGN PATENT DOCUMENTS

| | | |
|---|---|---|
| JP | 10-200583 | 7/1998 |
| JP | 2000-151629 | 5/2000 |
| WO | 96/38967 | 12/1996 |
| WO | 96/38994 | 12/1996 |
| WO | WO 01/17177 | 3/2001 |

OTHER PUBLICATIONS

T. Val etal. "Using LLC Type 1 and LLC Type 3 Services to Communicate Through A Hybrid Network With Mobile Devices" Communication for Global Users, Orlando, Dec. 6-9, 1992, Proceedings of the Global Telecommunications Conference, New York, IEEE, vol. 3, Dec. 6, 1992, pp. 1359-1363.

N-F. Huang et al. "Virtual Internetworking Over ATM Networks for Mobile Stations" Proceedings of the IEEE INFOCOM '97 The Conference on Computer Communications, 16th Annual Joint Conf. of the IEEE Computer and Communications Societies, Driving the Information Revolution, Kobe, Apr. 7-12, 1997, Los Alamitos, CA, vol. 3, Apr. 7, 1997, pp. 1397-1404.

B. Patel et al. "The Mobile ATM LAN Emulation Protocol", 1997 IEEE 6th International Conference on Universal Personal Communications Record. San Diego Oct. 12-16, 1997, IEEE International Conf. on Universal Personal Communications, New York, vol. 2, Conf. 6, Oct. 12, 1997, pp. 416-420.

T. Saito et al "IEEE1394 Home Networks", NEC Research and Development, Nippon Electric Ltd.,Tokyo, JP, vol. 41, No. 2, Apr. 2000, pp. 146-152.

Y. Niwa et al "Development of a 1394 Bridge System Based on P1394.1", International Conf. on Consumer Electronics, 2000 Digest of Technical Papers, ICCE., Jun. 13-15, 2000, New York, pp. 204-205.

Search Report dated May 2, 2003.

"Broadband Radio Access Networks (BRAN); HIPERLAN Type 2 Technical Specification; Packet based Convergence Layer;, Part 3: IEEE 1394 Service Specific Convergence Sublayer", DTS/BRAN-00240004-3 V0.g (Jun. 2000), European Telecommunications Standards Institute, Jun. 2000.

* cited by examiner

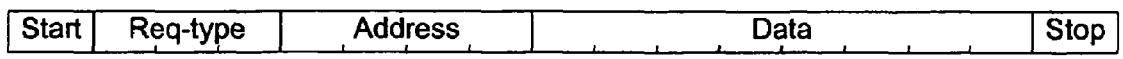
Fig. 3
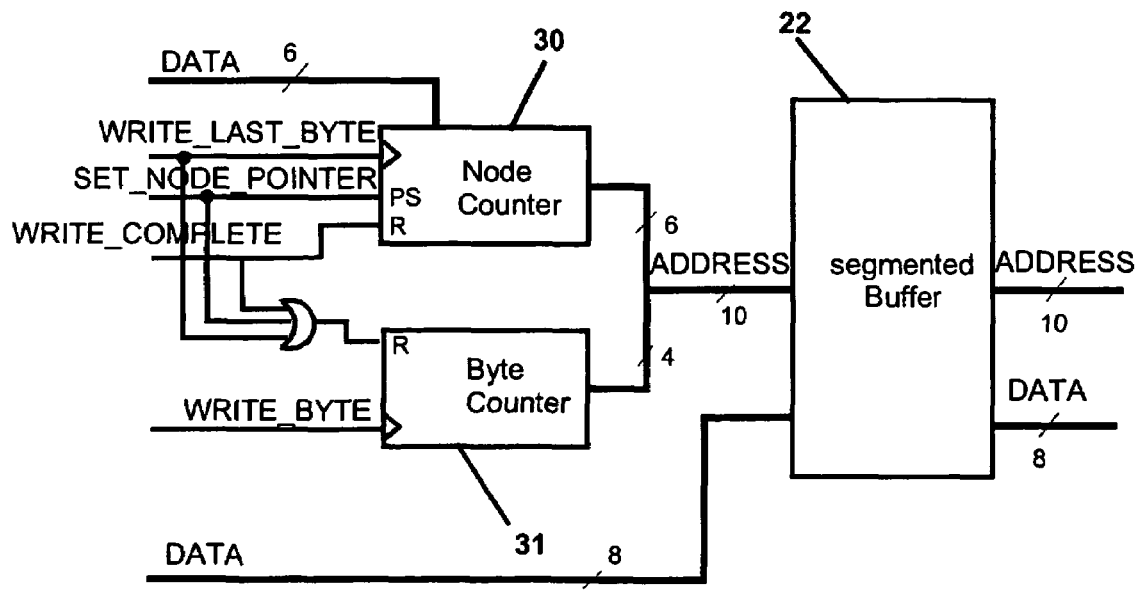
Fig. 4
Fig. 5

NodeID Register bank at the remote side

NodeID Register bank at the cluster side

INTERFACE CIRCUIT CONNECTING A DEVICE WITH A BRIDGE PORTAL FUNCTION TO A COMMUNICATION BUS

This application claims the benefit, under 35 U.S.C. § 365 of International Application PCT/EP02/04286, filed Apr. 18, 2002, which was published in accordance with PCT Article 21(2) on Nov. 7, 2002 in English and which claims the benefit of European patent application No. 01250155.7, filed May 2, 2001.

The invention relates to an interface for connecting a device to a communication bus which device has a bridge portal function for a bridge between a first communication bus and a second communication bus.

BACKGROUND

In the field of home systems the IEEE 1394 bus has become an important communication system with asynchronous and isochronous transport capability. The IEEE 1394 serial bus already provides an internationally standardized and very widely accepted bus for data exchange between terminals from both, the consumer electronics field and the computer industry. The precise designation of the aforementioned standard is: IEEE Standard for high performance serial bus, (IEEE) STD 1394-1995, IEEE New York, August 1996. In 2000 an improved version has been finalised with the reference IEEE 1394-2000.

The IEEE 1394 bus is a wired bus and it is specified that a maximum of 63 stations can participate in the communication over the bus lines. The 63 stations can be distributed in a flat or house. The maximum distance between two stations is 4.5 m. However, there are also solutions existing that extend the distance.

A problem with all wired bus systems is that the bus cable needs to be installed in every room where a bus station shall be located. This problematic gave rise to the wish of a wireless extension of the IEEE 1394 standard. A standalone device or a cluster of devices shall communicate with a first cluster by means of a wireless link.

In the meantime there are wireless protocols existing that can be used for the wireless link. The document 'Broadband Radio Access Networks (BRAN); Hiperlan Type 2; Packet based convergence layer; Part 3: IEEE 1394 Service Specific Convergence Sublayer (SSCS)" defines a sublayer emulating the IEEE 1394 link layer over a ETSI BRAN Hiperlan/2 wireless network. As such, it may be present in bridge devices between wired 1394 busses, or in standalone wireless devices. When two busses are connected through a bridge, these two busses are still considered distinctly from the point of view of the IEEE 1394 standard. Moreover, since the sublayer has to be present in a standalone device, standard 1394 devices first have to be modified in order to be linked to a network through a wireless link.

The interconnection of the different busses (with different bus_IDs) involves a IEEE 1394 bridge, which is currently under definition by the IEEE P1394.1 working group. Because of the use of different bus_IDs, an application operating on bridges shall be bridge aware.

The box that connects the 1394 bus cable of a cluster to the wireless bridge needs to have a standard conform interface but on the other hand it needs to have some additional functionality which concerns the self configuration phase of the network. The 1394 bus has live insertion capability and each time a device is added or removed from the bus a bus reset is performed. After a bus reset each bus node sends a self-id packet to the bus, with which all other stations on the bus become aware of how many stations are present on the bus. The ID-number is a 6 bit number so that 64 devices can be distinguished. There is a specific process defined in the 1394 standard with which the ID-numbers are assigned to the stations. This will be described in more detail later on.

If all the stations in the network shall be configured as belonging to one 1394 bus, the self-configuration phase must be performed in coordinated fashion in both clusters with the bridge circuit in-between.

The devices of the second cluster are not aware that they are connected via a wireless link to the network. To achieve transparent operation, it is necessary that the wireless converters shall generate Self-ID packets that are reflecting the topology on both busses.

INVENTION

According to IEEE 1394 standard the generation of self-ID packets after a bus reset is performed in the physical layer section of the 1394 interface circuit. According to the invention the interfaces connecting the boxes for the wireless link shall have an enhanced 1394 interface in each case. They shall include a buffer memory in which the self-ID packets of the stations not belonging to the same cluster are stored. This buffer memory shall be part of the physical layer circuit section of the interface. This has the reason that after a bus reset communication shall be commenced as early as possible. With the implementation of the buffer in the physical layer section it is assured that there is the slightest delay between bus grant and self-ID packet transmission. The buffer memory that is used to buffer application data can therefore be smaller.

Further improvements of the interface circuit according to the invention are possible by virtue of the measures evinced in the dependent claims. During self-ID packet collection the buffer memory is addressed by means of a node counter and a data word counter in order to store the data words of the self-identification packets. As the self-ID packets are received in ascending order, they can be written in memory in the same order and it is not necessary to implement a complex address management logic.

A number of specific control registers can be used to control the operation of the node counter and data word counter such as incrementing, presetting and resetting a counter.

Further registers can be implemented as a pointer to a start and end value for a specific range in the buffer memory, such as the range where the box shall just listen to the received self-ID packets or the range where the box needs to send self-ID packets to the bus. This facilitates address generation during the self-configuration phase.

It is also advantageous that the interface circuit comprises means for calculating an offset value for the buffer memory addressing each time after a bus reset wherein the offset value is calculated as the difference of the number of received self-ID packets from the communication bus on the other side of the bridge plus 1 and the start or end address in one of the above mentioned further registers. This allows for a direct generation of the self-ID packets when after a first bus reset the self-configuration phase of the network had been finished but due to a second bus reset phase some modification is required. Here, the data communication between stations that were present already before the second bus reset can be maintained very fast.

DRAWINGS

Exemplary embodiments of the invention are illustrated in the drawings and are explained in more detail in the description below. In the figures:

FIG. 3 shows the format of a self-ID packet;

FIG. 4 shows the format of a write request to a register in the interface circuit;

FIG. 5 shows a block diagram for addressing the buffer memory for storing self-ID packets in the self-configuration phase;

EXEMPLARY EMBODIMENTS OF THE INVENTION

Figure 1:
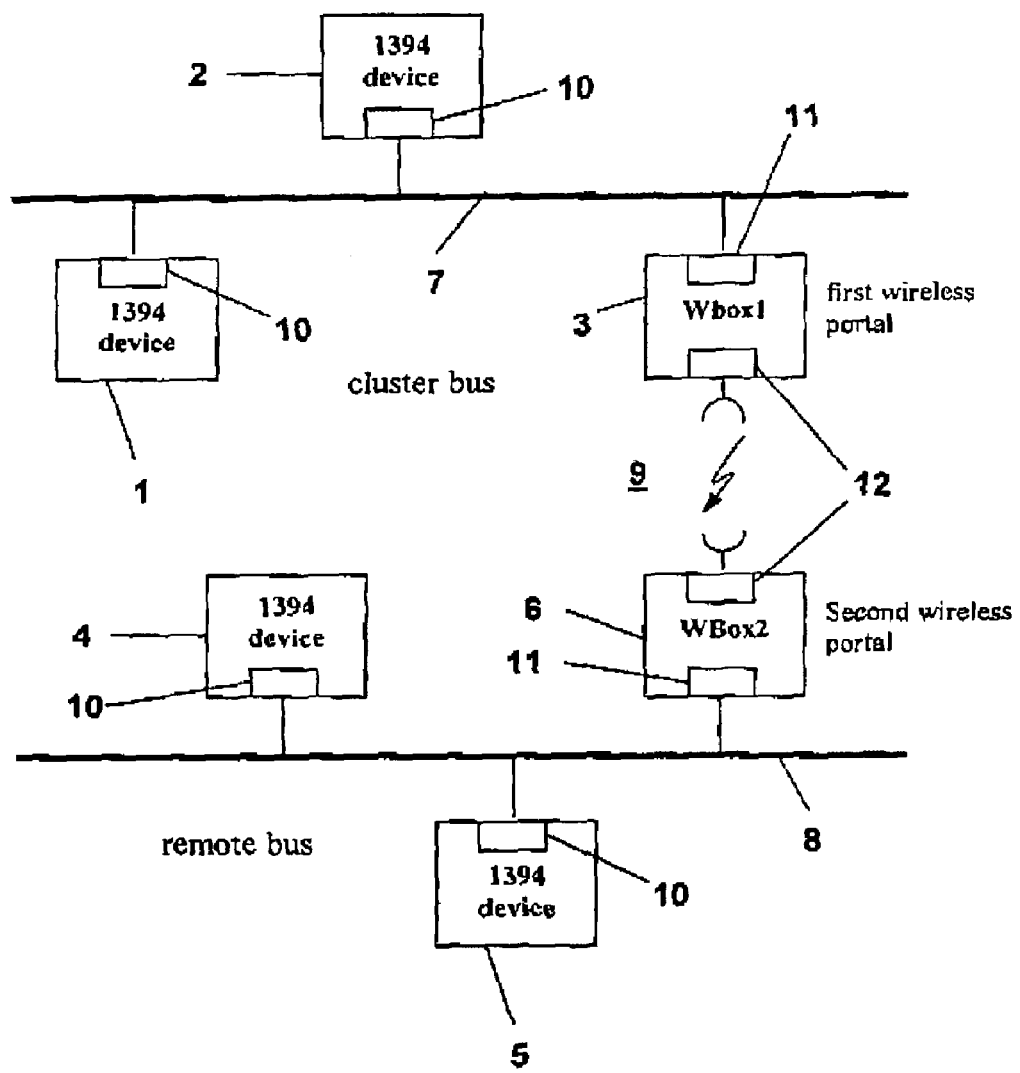
FIG. 1 shows two 1394 clusters connected to each other via a wireless bridge.

FIG. 1 shows two 1394 busses with 1394 bus stations and a wireless bridge in between. The first 1394 bus has assigned reference number 7. A first and second 1394 device is shown with reference numbers 1 and 2. Such a device can be a consumer electronics device such as TV set, VCR, Camcorder, Set Top Box, DVD player, etc. or a computer device like PC, Notebook, etc. Each of these devices is a standard conform 1394 device and has a corresponding 1394 interface 10.

With reference number 3 a first transceiver box for the wireless link 9 is denoted. This box also needs to have a 1394 interface because it is also connected to the 1394 bus lines 7. The corresponding interface has got reference number 11 in FIG. 1. This indicates already that it is not the same 1394 interface as that of devices 1 and 2. 1394 interface 11 has additional functionality involving the invention. Transceiver box 3 further has another interface 12 for wireless transmission. There are wireless protocols already existing supporting high speed communication. As an example the Hiperlan system is mentioned. The document 'Broadband Radio Access Networks (BRAN); Hiperlan Type 2; Packet based convergence layer; Part 3: IEEE 1394 Service Specific Convergence Sublayer (SSCS)" defines a sublayer emulating the IEEE 1394 link layer over a ETSI BRAN Hiperlan/2 wireless network other examples of wireless communication protocols for the wireless link are the IEEE 802.11 system and the Bluetooth system.

There is another cluster of 1394 devices shown in FIG. 1 having its own 1394 bus 8. Again, two 1394 devices 4 and 5 are depicted having standard 1394 interfaces 10. A second box 6 for the wireless bridge 9 is connected to the bus 8 as well. For the conception of the invention it is required that the total amount of bus stations in both clusters together inclusive wireless transceiver boxes 3 and 6 is less than or equal to 63. This is because with the wireless bridge 9 both clusters are merged together and data communication between devices from different clusters is from the point of view of the 1394 devices by no means different than for communication between devices in one cluster. The maximum allowed number of bus nodes in a 1394 cluster is however 63. It is defined that the bus where a transceiver box of a wireless bridge has become the root device will be the remote bus. If in both busses a transceiver box of a wireless bridge has become the root device, a decision has to be made for example by game of dice.

A scenario with only one 1394 device in the remote cluster is described in the European Patent Application 00402901.3. A scenario with more than one 1394 device in the remote cluster is described in the European Patent Application 01400826.2.

Figure 2:
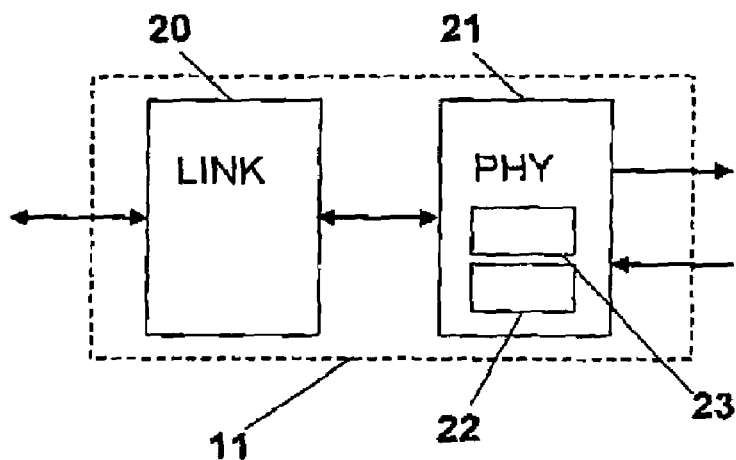
FIG. 2 shows a block diagram of the interface circuit according to the invention.

FIG. 2 shows the principal structure of a 1394 interface 10. The 1394 interface is subdivided in two parts a physical layer section 21 and a data link layer section 20. Both can be integrated in one single chip or two distinct chips. In principle it would also be possible that the data link layer section is implemented in software running on a powerful micro controller. Also the modified 1394 interface 11 has the same principle structure. The modification concerns a specific buffer memory 22 in the physical layer section and its management that will be explained later on. For this purpose the modification also concerns the addition of seven control registers referenced with block number 23.

To understand the modification of the physical layer chip it is helpful to first explain what happens in case of a bus reset. A bus reset is performed each time a 1394 device is plugged off (disconnected) from or plugged in (connected) to the bus. The 1394 bus standard provides full live insertion capability. This means that a device can be removed from or inserted in the bus lines without switching off the network. An insertion or removal of a bus station is accompanied by a specific voltage change on the bus lines that is detected by electronic means providing the bus reset. After a bus reset a self-configuration phase follows for the network. During the self configuration phase each bus station sends it self-ID packet to the bus to inform every other user in the network that it is existing.

A self-ID packet has the format of that in FIG. 3. It consists of 64 bits where the last 32 bits are the inverse of the first 32 bits. Of course all bits of the self-ID packets are explained in the 1394 standard itself. Some of them will be expressively explained here. At the beginning of a self-ID packet there is the physical ID-number of the bus station. This field has a length of 6 bits corresponding to the numbers 0 . . . 63. At the end of the self-ID packets there are 2-bit fields for the ports P0 to P2 of a bus station. With the two bits it can be notified not only the existence of the port in the station but also whether the port is active and connected to a parent or child in the bus topology. According to the IEEE1394 bus standard a bus station can be equipped with up to 16 ports. If a station has more than 3 ports their status will be reported in a second or third self-ID packet. The last bit m in the self-ID packet has the function to indicate whether the station has some further ports or not. With the 1394 bus data communication is possible with half-duplex operation mode. Therefore, only one station is sending data to the bus and the rest is listening. The bus is granted to the stations in a deterministic manner depending on the bus topology (in particular whether a station is branch or leaf). The physical ID number is assigned to the stations in the order of bus grant beginning from Zero. For addressing a data packet not only the physical ID-number (node-ID) is used. Each bus also has a bus-ID which also needs to be taken into account during addressing.

In case of the bus structure shown in FIG. 1 a number of problems occur during self-configuration after a bus reset. The devices are not aware that they are connected via a wireless link to the network. The bridge makes a bus reset isolation. The self-ID packets need to be forwarded from one cluster to the other via the wireless link.

Now it is considered that a bus reset happened in the cluster bus 7. The reset is detected by all stations 1, 2, 3 in the cluster. After the bus reset the stations will send their self-ID packets one after the other. Each station in the cluster will collect the corresponding information in a higher software layer, e.g. in the transaction layer in order to be able to generate the right addresses later on. The interface 11 in the transceiver box 3 also receives each self-ID packet and forwards them via the wireless link to the second transceiver box 6. Also the box 3 generates a self-ID packet and sends it to the 1394 bus 7. In the first attempt wireless transceiver box 3 operates in legacy mode and generates a self-ID packet without taking into account that in case that the bridge is replaced by a 1394 cable, it would have a different physical ID number.

After having collected all self-ID packets from the cluster bus, the box 3 initiates a bus reset on the cluster bus by software means. Again the self-ID packets are transmitted over the bus. The difference is that when it is the turn of the box 3 to send its self-ID packet, it will generate not only its own self-ID packet but also all the self-ID packets of the stations in the remote cluster whereby the box 3 generates the self-ID packets under consideration of the topology which would result if the wireless link would be replaced by a 1394 cable. In the following the self-ID packets generated by the box 3 in representation of the stations in the cluster bus are called artificial self-ID packets.

Next, a bus reset is also initiated on the remote bus 8 by software means in box 6. The box 6 has collected all self-ID packets from the cluster bus and generates the corresponding artificial self-ID packets in this phase. After this phase the self-configuration is finalised and normal data communication can continue.

As explained above to achieve transparent operation, it is necessary that the Physical Layer chip in the interfaces 11 of the wireless transceiver box 3 and 6 generate self-ID packets that are reflecting the topology on both busses.

To do that the content of artificial self-ID packets to be generated automatically by the PHY IC will be stored in an specific buffer memory 22 in the PHY IC which can be a register bank (or RAM). Taking into account the format of a self-ID packet, only the information of the first quadlet of each self-ID packet will be stored in this register bank. The second quadlet of each self-ID packet will be created on the fly by the PHY chip itself (logical inverse of the first quadlet).

The number of self-ID packets per node is dependent on the implemented ports per node. The maximum number is three self-ID packets per node according to the IEEE1394-2000 version and four in the standard IEEE 1394-1995. To be compatible with the old version leads to a minimum size of the register bank of 16 byte*62 nodes=992 bytes.

The micro controller of the wireless link will provide the information of the artificial self-ID packets. This information is stored in the register bank of the PHY. In the following it is explained how the data is written in the register bank by means of link requests LREQs to PHY registers located in a reserved register page (register page 2 ... 7).

The concept of link requests is disclosed in the IEEE 1394 standard itself. Every control command from the link IC is transferred to the PHY IC in the format shown in FIG. 4, which is defined in the 1394 standard. The command is delivered in serial form from LINK to PHY. After a start bit a three bit request type field and a 4 bit address field follows. Thereafter the instruction data byte follows. With the stop bit the command is finished.

The register bank should be organized in fixed areas corresponding to the node ID's (e.g. the reserved register space for self-ID packets of one node may be 16 byte). This will enable the PHY chip to respond immediately to PING packets addressed to a specific node ID by a simplified address resolve mechanism.

If the Self ID packets are placed in ascending order of node numbers in the buffer, the buffer size can be reduced by 6 bits per self-ID packet, which contains the physical node number. In addition the leading 10b bits in each self-ID packet has not to be stored in the register bank. From this it follows that the minimum size of the register bank will be:

12 byte*62 nodes=744 bytes.

To address the buffer 10 binary digits are needed, whereby the 4 least significant bits, in the following denoted byte address, represent the address space for the self-ID data from one node, the 6 most significant bits represent the number of the node, in the following denoted node address.

The addressing scheme is shown in FIG. 5. Reference number 22 denotes the register bank or buffer memory. For addressing the buffer 22 during self-ID packet collection a node counter 30 and a byte counter 31 are provided. The node counter is 6 bits wide and the byte counter is a 4 bit counter. Both outputs together build the 10 bit address bus for the buffer memory. An 8 bit data bus is provided for delivering a data byte of a self-ID packet to the memory. The buffer memory can be of the DPRAM type (dual port RAM). In this case its content can be read out independently from the writing operation. Corresponding address and data busses are therefore also available at the other side of the buffer. A 6 bit data bus is connected to the node counter. This is necessary to be able to preset the node counter to a specific value.

The buffer memory is loaded by means of link requests. For this purpose the following instructions are newly defined (see table 1):

TABLE 1

Extended PHY instruction list

| Address | Instruction | Actions |
|---------|-------------|---------|
| 1000b | Write_byte | A byte of self-ID content will be written to the register bank. The byte counter is incremented. The node counter shall remain unchanged. |
| 1001b | Write_last_of_ID | A byte of self-ID content will be written to the register bank. The byte counter is set to zero. The node counter is incremented. |
| 1010b | Write_complete | A byte of a self-ID packet is written to the register bank. The node counter and byte counter are set to zero. The PHY chip shall respond to bus resets and PING packets in accordance to the content stored in the register bank. |
| 1011b | Set_node_id_pointer | The node counter is set to the value given in the argument. The byte counter is set to zero. The content of the register bank will remain unchanged. |
| 1100b | Tx/Rx_start | Defines the start value of the node counter for the register bank to transmit or receive self-ID packets depending on whether the register bank is in the transceiver box of the cluster bus or remote bus. |
| 1101 | Tx/Rx_end | Defines the end value of the node counter for the register bank to transmit or receive self-ID packets depending on whether the register bank is in the transceiver box of the cluster bus or remote bus. |
| 1110b | Mode Remote ID_end | The 6 least significant bits of the ID_end register define the valid end address of the register bank in the current configuration. The Mode bit of this register enables/disables the transmission of artificial self-ID packets. The Remote bit defines the |

TABLE 1-continued

Extended PHY instruction list

| Address | Instruction | Actions |
|---|---|---|
| | | operation mode for reading the register bank. |

The instructions listed in table 1 can be easily implemented by using reserved PHY registers in the PHY chip. In the IEEE 1394 standard eight register pages á 16 registers are provided among them the pages 2 . . . 7 are reserved. The extended PHY register map is shown in table 2.

TABLE 2

Extended PHY register map

| | 0 | 1 | 2 | 3 | 4 | 5 | 6 | 7 |
|---|---|---|---|---|---|---|---|---|
| $1000_2$ | | | | Write_byte | | | | |
| $1001_2$ | | | | Write_last_of_ID | | | | |
| $1010_2$ | | | | Write_complete | | | | |
| $1011_2$ | ■ | ■ | | Set_node_id_pointer | | | | |
| $1100_2$ | | | | Tx/Rx_start | | | | |
| $1101_2$ | ■ | ■ | | Tx/Rx_end | | | | |
| $1110_2$ | Mode | Remote | | ID_end | | | | |
| $1111_2$ | ■ | ■ | | Offset | | | | |

From FIG. 5 it is evident how the node counter 30 and byte counter 31 are controlled by the different actions of the instructions in the table above.

In case that no self-ID packet information has been loaded in the register bank 22, the modified PHY IC should behave as a standard conform Physical layer IC (possibly with the Root hold-off bit and the L bit set to one). Physical Layer ICs are commercially available. E.g. the chip TSB21LV03 from Texas Instruments is a PHY IC for the IEEE 1394 bus.

Only when the register bank is completely loaded, indicated by writing the last byte of the register bank to the special register address "Write_complete" and the number of nodes plus 128 (MSB set to one) has been written to ID_end, the PHY IC shall respond to a bus reset (or to PING packets) with artificial self-ID packets according to the method described below.

A Physical layer IC shall send artificial self-ID packets in the node number range from zero to ID_end only if one of the bits 24 . . . 29 (NPORT bits, port connection status) or bit 31 (more_packets) of the self-ID packet information is unequal zero. If the m (more_packets) bit is set it shall provide immediately an additional self-ID packet for this node. If the content of the bits 24 . . . 29 or 31 is equal zero the Phy shall release the bus to allow other local nodes to provide their own self-ID packets. The Phy shall respond to PING packet only if the port_connection_status bits 24 . . . 29 or 31 are not equal zero for the requested node.

The modification of the two reserved bits (bridge bits) in the standard conform self-ID packet shall be implemented.

Additional the Phy shall recalculate the physical ID's for the artifical SelfID packets after every bus reset in case that a device is plugged in or plugged off. The new physical ID (Node_ID*) is calculated with the simple formula $$\text{Node\_ID*} = \text{Node\_ID} + \text{Offset}$$

whereby Offset is defined as the difference of the number of received SelfID packets in the cluster after a bus reset plus one and the Rx/Tx_start or Rx/Tx_end value from the self-configuration phase before the bus reset.

In case the Phy is part of the remote bus:

$$\text{Offset} = (\text{number of received self-ID packets} + 1) - Rx/Tx\_\text{end}$$

In case the Phy is part of the cluster bus:

$$\text{Offset} = (\text{number of received self-ID packets} + 1) - Rx/Tx\_\text{start}.$$

Figure 6:
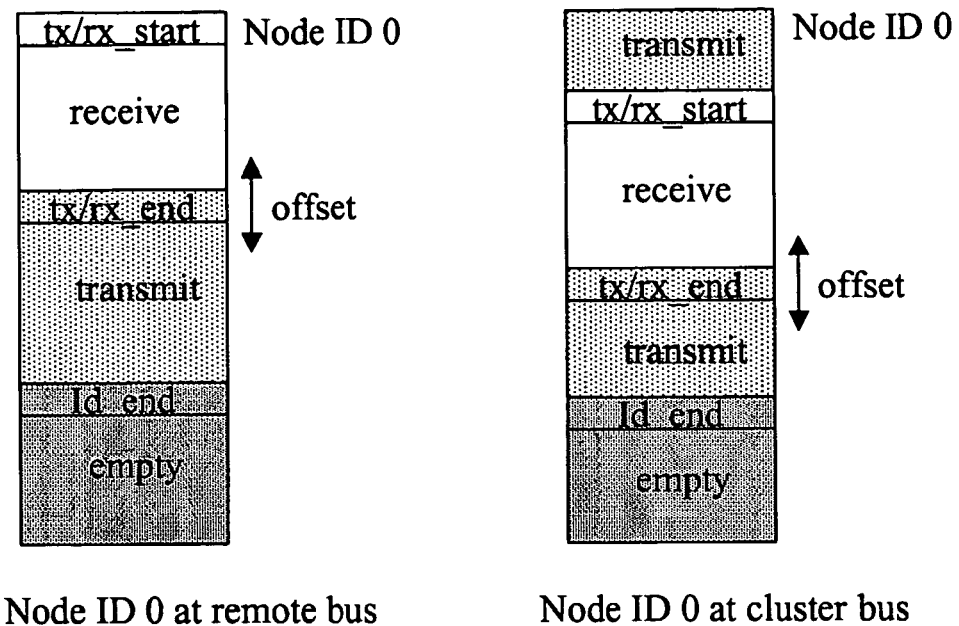
FIG. 6 shows a first example of a buffer memory configuration according to the invention.
Figure 7:
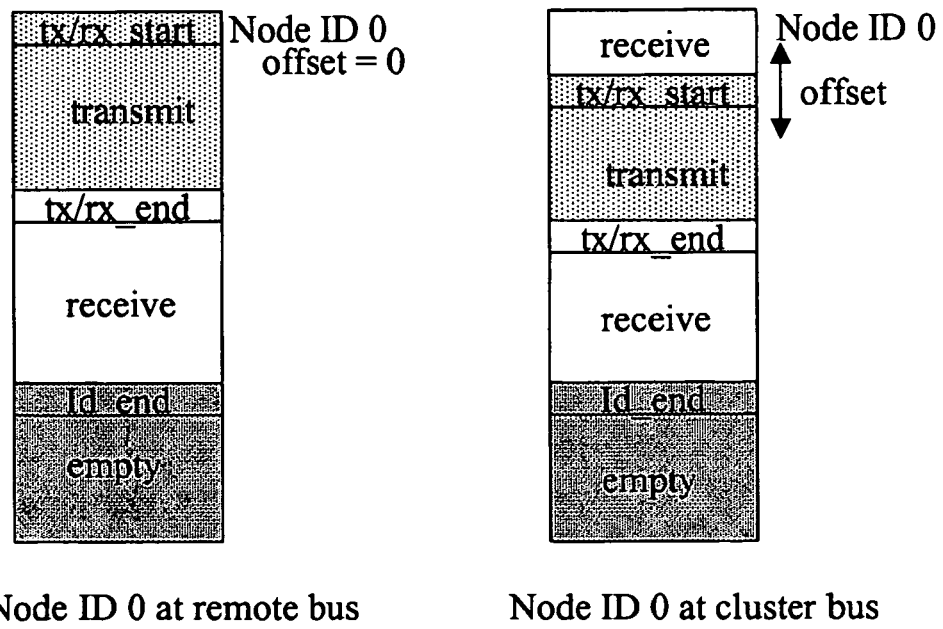
FIG. 7 shows a second example of a buffer memory configuration according to the invention.

Taking into account to which bus the node number '0' belongs, different buffer memory configurations are possible. They are shown in FIGS. 6 and 7. FIG. 6 shows the configurations in interface 11 at the transceiver box 6 of the remote bus for the case that the lowest node number '0' belongs i) to the remote bus and ii) to the cluster bus. FIG. 7 shows the configurations in interface 11 at the transceiver box 3 of the cluster bus for the case that the lowest node number '0' belongs i) to the remote bus and ii) to the cluster bus. For example the case node ID 0 at cluster bus in FIG. 6 is characterized that artificial self-ID packets need to be transmitted to the remote bus starting from physical ID '0' to physical ID 'tx/rx_start minus 1' and in the range 'tx/rx_end' to 'ID_end minus 1'. In the range 'tx/rx_start' to 'tx/rx_end' the interface listens to the self-ID packets from the remote bus and forwards them to the other transceiver box 3. The buffer is empty from the address ID-end on.

With the concept of the offset value calculation for the node IDs each time after a bus reset it is possible to restart data communication very fast. This is because the transmittance of artificial self-ID packets is accelerated because it need not be waited until after a bus reset all artificial self-ID packets are updated in the buffer memory. Instead the old entries are used again, apart from the physical-ID numbers that are modified with the offset value.

The invention claimed is:

1. An interface circuit for connecting a device to a first communication bus, the interface circuit comprising:
    a physical layer section and a data link layer section, wherein the physical layer section includes a buffer memory in which self-identification packets received via a wireless bridge from a second communication bus are collected,
    means for generating artificial self-identification packets from said self-identification packets collected in the buffer memory, wherein the artificial self-identification packets are generated under consideration of the topology which would result if the wireless bridge would be replaced by a bus cable,
    means for sending said artificial self-identification packets in order to be able to forward them to said first communication bus after a bus reset,
    a first and second control register in which a start value and an end value of a specific range in said buffer memory are stored for facilitating determination of a memory location that needs to be read out during a self-configuration phase of said network of bus stations of said first and second communication bus, and
    means for calculating an offset value for the modification of node ID numbers in the stored self-identification packets each time after a bus reset, wherein the offset value is calculated as the difference of the number of received self-identification packets after a bus reset on either the first or second communication bus plus one and the start or end value in the first and second control register depending on whether the interface circuit is part of a cluster or remote bus.

2. The interface circuit according to claim 1, wherein a self-identification packet has a defined length and identifies a node on a communication bus.

3. The interface circuit according to claim 1 wherein during the self identification packet, collection the buffer memory is addressed by means of a node counter and a data word counter in order to store the data words of the self-identification packet.

4. The interface circuit according to claim 3, comprising a third control register which when addressed initiates an increment of the node counter and said third control register is addressed each time the last data word of a self-identification packet is written in said buffer memory.

5. The interface circuit according to claim 4 wherein the third control register when addressed also initiates a reset of the data word counter.

6. The interface circuit according to claim 3, comprising a fourth control register which when addressed initiates an increment of the data word counter and the fourth control register is addressed each time a data word of a self-identification packet is written into said buffer memory.

7. The interface circuit according to claim 3, further comprising a fifth control register which when addressed initiates a reset of the node counter and data word counter, and the fifth control register is addressed each time the last data word of a self identification packet is written into said buffer memory.

8. The interface circuit according to claim 3, comprising a sixth control register which when addressed initiates a preset of the node counter to a value specified on corresponding data lines.

9. The interface circuit according to claim 8, wherein a sixth control register when addressed also initiates a reset of the data word counter.

10. The interface circuit according to claim 1 further comprising a seventh register in which the address of the last valid entry in the buffer memory is stored.

11. The interface circuit according to claim 10 wherein the seventh register includes an additional bit position with which the transmission of artificial self-identification packets can be enabled or disabled.

12. The interface circuit according to claim 11, wherein the seventh register includes an additional bit position with which two modes of reading self-identification packets out of the buffer memory can be distinguished, namely whether or not the interface circuit is part of a remote bus or cluster bus.

13. The interface circuit according to claim 1, wherein the first and second communication bus is a standard wired IEEE 1394 bus and said wireless bridge is a wireless bridge particular in accordance with Hiperlan/2, IEEE 802.11 or Bluetooth system.

* * * * *

UNITED STATES PATENT AND TRADEMARK OFFICE
CERTIFICATE OF CORRECTION

| | | |
|---|---|---|
| PATENT NO. | : 7,580,420 B2 | Page 1 of 1 |
| APPLICATION NO. | : 10/476420 | |
| DATED | : August 25, 2009 | |
| INVENTOR(S) | : Schweidler et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1472 days.

Signed and Sealed this

Fourteenth Day of September, 2010

David J. Kappos
*Director of the United States Patent and Trademark Office*